INVENTOR

ALBERT S. GOLDSTEIN, JR

BY Yungblut, Melville, Strasser and Foster
ATTORNEYS

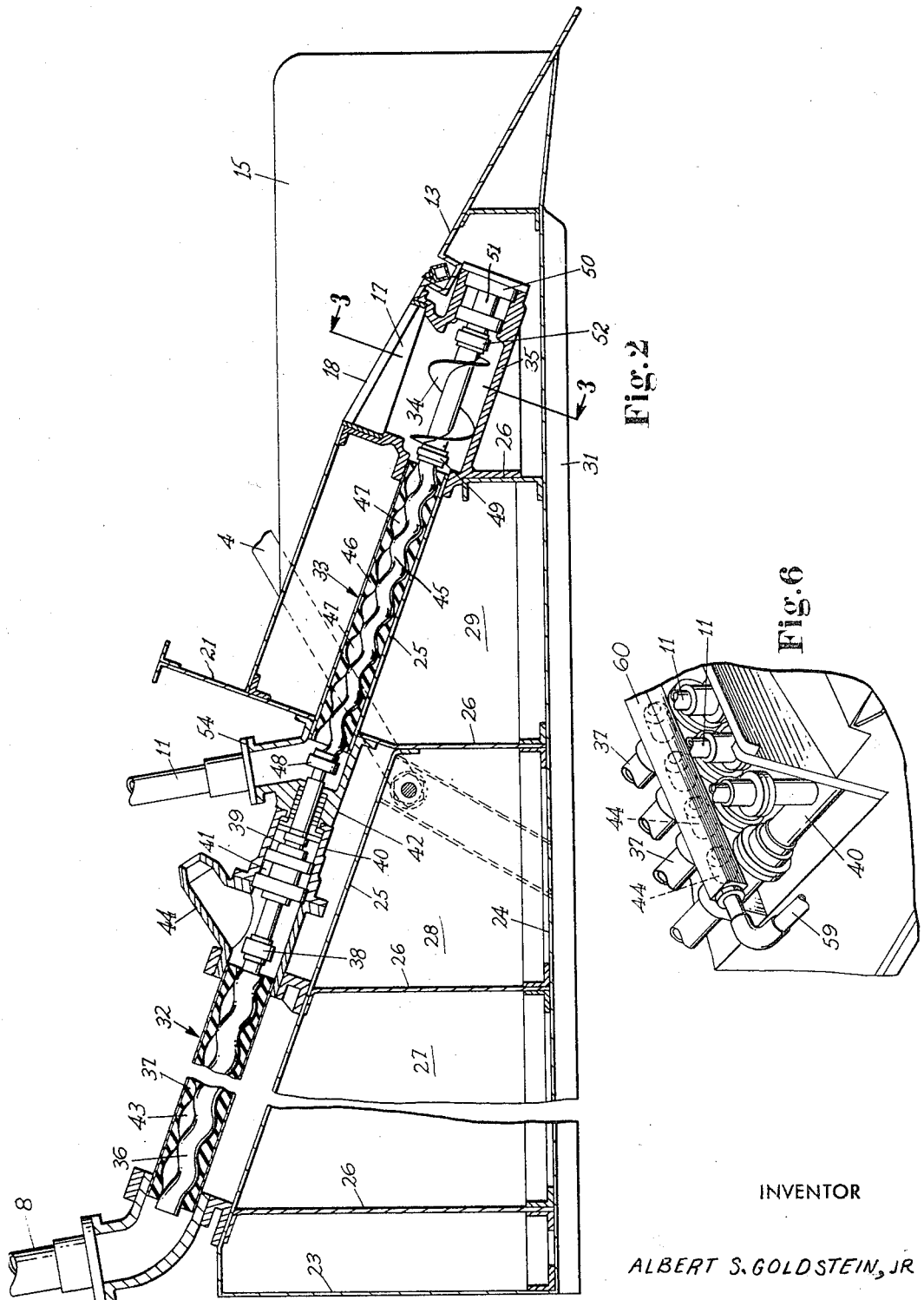

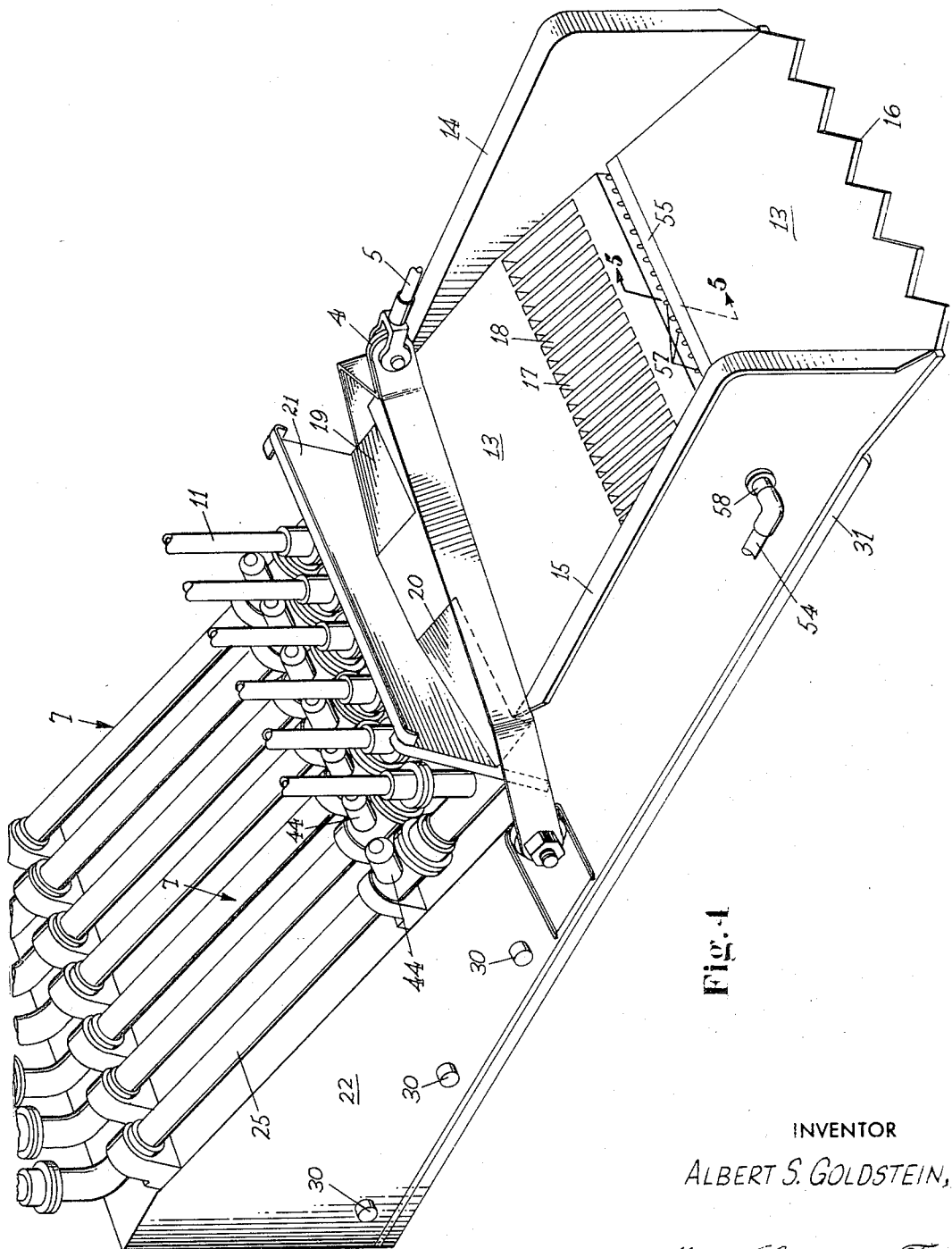

United States Patent Office 3,440,742
Patented Apr. 29, 1969

3,440,742
MULTIPLE MOTOR DREDGE
Albert S. Goldstein, Jr., 7530 Grandview Drive,
Indianapolis, Ind. 46260
Filed Dec. 8, 1965, Ser. No. 513,661
Int. Cl. E02f 7/02, 3/94; F04b 23/12
U.S. Cl. 37—57                    12 Claims

ABSTRACT OF THE DISCLOSURE

A pump type underwater dredge having fluid actuated motors arranged to operate a series of pumps which are operatively connected to augers which feed material collected by the dredge to the pumps for transmission to a remote collection station, the motors and pumps each comprising pairs of helical gears defining a rotor and a stator, the rotors of the motors being connected to the rotors of the pumps which in turn are connected to the augers.

---

This invention relates to dredges for removing earth, metal nodules, minerals, silt and alluvial wash from the bottom of a body of water, such as a river bed, harbor channel or ocean floor, and has to do more particularly with a pump type dredge wherein the earth, silt and the like collected by the dredge is pumped to the surface of the body of the water for disposal.

A principal object of the instant invention is the provision of dredging apparatus having fluid actuated motors mounted on the dredge and arranged to operate a series of pumps which in turn are operatively connected to augers which feed the earth collected by the dredge to the pumps for transmission through conduits to the surface of the body of the water for discharge at a collection station.

A further object of the instant invention is the provision of a dredging apparatus of the character described wherein the motors and pumps each comprise pairs of helical gears of the character disclosed and claimed in Moineau, United States Patents 1,892,217 and 2,028,407, as well as in other patents in the name of the same inventor. In such devices, the gear pair comprises a stator having internal helical threads and a rotor element having external helical threads, the rotor having one less thread than the stator. Such device may be used either as a motor or as a pump. In the event it is used as a motor, a liquid is pumped through the device whereby the rotor is caused to turn with respect to the stator, the rotor thus serving as a drive shaft. On the other hand, if the rotor is driven from an external source, the device becomes a fluid pump, the fluid being drawn into the stator from one end and discharged under pressure from the other. In accordance with the instant invention, a first series of such devices is utilized as motors, being driven by a fluid under pressure, with their rotors operatively connected to the rotors of a second series of devices which act as pumps, the rotors of the latter series of devices in turn being connected to the augers which feed the earth into the pumps. From the outset it will be understood that the earth being fed into the pumps will be in the nature of a slurry in that the apparatus is operating under water.

A further object of the instant invention is the provision of dredging apparatus of the character described wherein the dredge may comprise a dragline dredge adapted to be dragged across the bottom of the body of water, or it may be self-propelled, being provided with crawlers, driving wheels or the like.

Still a further object of the invention is the provision of a dredge of the character described wherein the dredge incorporates a plurality of ballast compartments by means of which the dredge may be more readily raised and lowered or maintained in the desired dredging position.

Still a further object of the invention is the provision of a dredge of the character described wherein the fluid utilized to drive the motors—which fluid is usually water—may be utilized subsequent to its passage through the motors to form high velocity jets or streams impinging upon the earth collected by the dredge so as to assist in converting it into a slurry which will readily pass through the pumps.

The foregoing together with other objects of the invention which will appear hereinafter or which will be apparent to the skilled worker in the art upon reading this specification, are accomplished by that construction and arrangement of parts of which an exemplary embodiment shall now be described.

Reference is made to the accompanying drawings wherein:

FIGURE 2 is an enlarged vertical sectional view of the dredge taken through one of the motor-pump assemblies.

FIGURE 4 is a perspective view of the dredge.

FIGURE 6 is a fragmentary perspective view illustrating how the fluid outlets from the motor may be manifolded to supply fluid to the spray bar.

Figure 1:
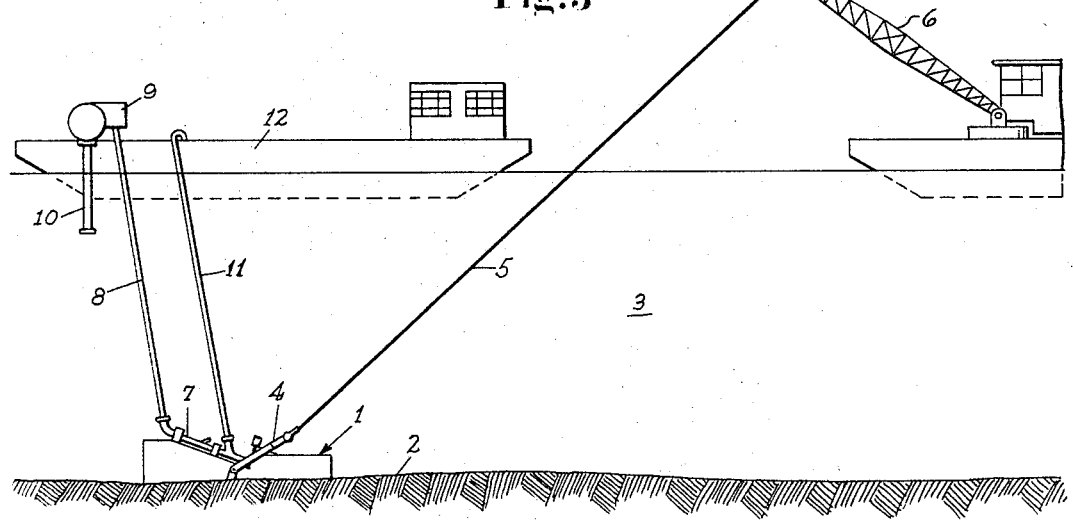
FIGURE 1 is a diagrammatical side elevational view illustrating the general operation of the dredging apparatus.

Referring first to FIGURE 1 of the drawings, the dredge is indicated generally at 1 as it rests on the bottom 2 of a body of water 3. In the embodiment illustrated, the dredge is provided with a yoke 4 connected to a dragline 5 by means of which the dredge may be dragged along the bottom, as by means of the barge mounted crane 6. The motor and pump units, indicated generally at 7, are mounted on the dredge, the inlet ends of the motors being connected to fluid supply conduits 8 which extend upwardly to a barge mounted pumping unit 9 which, in the embodiment illustrated has an inlet 10, thereby utilizing the body of water 3 as the source of fluid for the motors. The earth removed by the dredge is pumped upwardly through a series of conduits 11 to the barge 12 which serves as a collection station. From the outset, it is to be understood that the arrangement illustrated is exemplary only and does not constitute a limitation on the invention. Depending upon the conditions of use, the dredge may be operated from a single barge or similar floating support, or from a shore installation.

The body of the dredge will be preferably constructed from steel, being provided with a forwardly projecting scoop composed of inclined bottom wall 13 and opposing side walls 14 and 15. The leading edge 16 of the bottom wall is preferably of toothed configuration so that it will bite into the earth as the dredge is dragged along by the dragline. The bottom wall 13 is provided with a transverse opening 17 extending the full width of the bottom wall, the opening being covered by grating 18 which serves to limit the size of the material passing through the augers which underlie the opening. At its rearmost end the bottom wall 13 coincides with the uppermost edges of the side walls 14 and 15 where it is provided with an oppositely directed pair of outwardly and downwardly inclined chutes 19 and 20 which coact with the abutment 21 to discharge excess material collected by the scoop.

The body of the dredge extends rearwardly of the scoop portion, having enclosing walls, such as the side wall 22, rear wall 23, bottom wall 24 and top wall 25, thereby providing an enclosed hollow body which preferably will be divided by bulkheads 26 into a plurality of ballast tanks, such as the tanks 27, 28 and 29. These tanks will be provided with suitable inlet and outlet ports, diagrammatically indicated at 30 in FIGURE 4, by means of which air or water may be selectively introduced in and removed from the several tanks. The bottom of the dredge will be provided with a plurality of skids 31 which will serve both to facilitate sliding movement of the dredge and also protect the bottom wall 24 from obstructions which might be encountered.

In the embodiment illustrated the dredge is provided with six motor and pump units, although it will be understood that the number of such units may be varied depending upon the size and desired capacity of the dredge. As best seen in FIGURE 2, each of the motor and pump units comprises a motor 32, a pump 33, and an auger 34, the latter being mounted within a compartment 35 underlying the opening 17 in the bottom wall 13 of the scoop. Each of the motors 32 comprises a helical rotor 36 mounted within a stator 37 the lowermost end of which is connected to a universal joint 38 which in turn is connected to a drive shaft 39 mounted within a housing 40 by means of sealed bearing assemblies 41 and 42. With this arrangement, fluid under pressure is introduced into the leading end of the motor through fluid supply conduit 8, the fluid causing the rotor 36 to rotate as the fluid flows through the pockets 43 which move in a spiral manner longitudinally of the motor, the fluid being discharged from the trailing end of the rotor through an outlet port 44. Since the rotor rotates about its own axis and also orbits in a cylindrical path about the axis of the stator, the universal joint 38 permits the drive shaft 39 to rotate about its longitudinal axis while the rotor driving it moves in an orbital path.

The pumps 33 are each composed of a rotor 45 and a stator 46 having pockets 47 therebetween. However, the rotor and stator of the pump are of opposite hand from the rotor and stator of the motor 32. That is, if the motor 32 has a right hand thread, the pump 33 will have a left hand thread so that even though the rotors 36 and 45 are rotating in the same direction—as in a clockwise direction—the pockets 47 in the pump will move in the opposite direction to the pockets 43 in the motor, i.e., from the lowermost end of the pump toward the end adjacent the motor. A universal joint 48 connects the drive shaft 39 to the rotor 45 of the pump, thereby permitting the rotor 45 to be driven in its orbital path by the drive shaft 39 which rotates about its longitudinal axis.

At its opposite or lowermost end the rotor 45 is connected by universal joint 49 to the auger 34 which, in the embodiment illustrated, is journaled at its opposite end in an outboard bearing assembly 50, the bearing assembly receiving a stub shaft 51 connected to the auger by means of a universal joint 52. Such arrangement eliminates the necessity for a bearing assembly at the inboard end of the auger, although an inboard bearing may be provided if so desired, in which event the universal joint 52 may be eliminated. Alternatively, the outboard bearing 50 may be eliminated in its entirety, the auger being supported solely from its inboard end. With such arrangement, the augers may be extended and exposed to provide a boring function.

Figure 3:
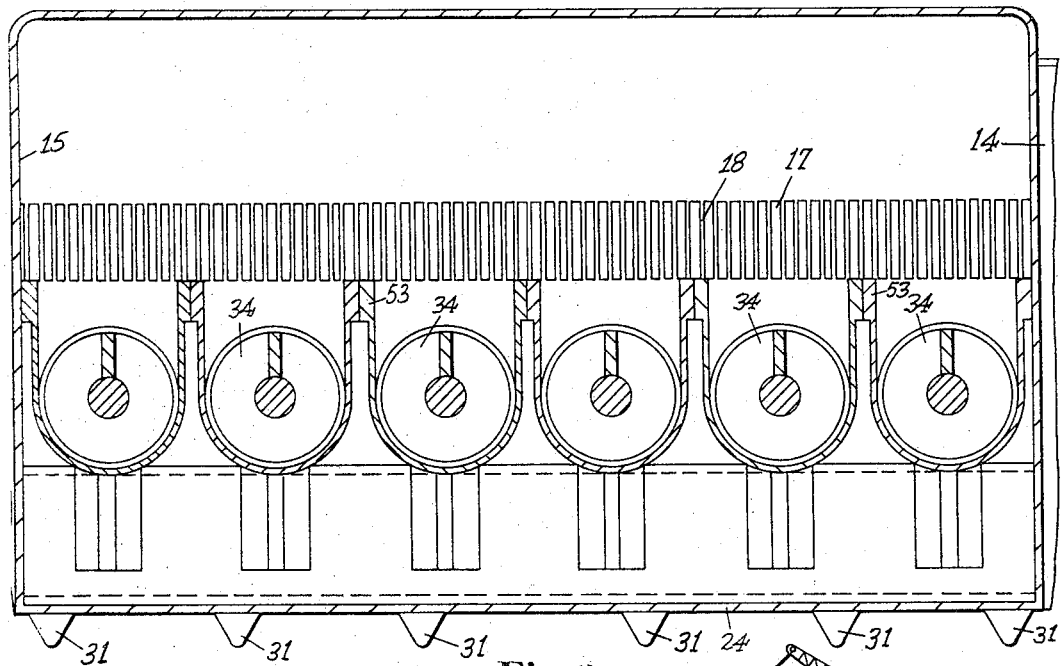
FIGURE 3 is a vertical sectional view taken along the line 3—3 of FIGURE 2.

In the operation of the device, earth, silt and the like picked up by the scoop will pass through the grating 18 and opening 17 into the auger compartments 35. In this connection, it is preferred that each of the augers be housed in its own compartment, as will be evident from FIGURE 3 wherein it will be seen that the compartments are defined by U-shaped housings 53. The augers act as screw conveyors to force the material into the lowermost ends of the pumps. The augers also act to admix the earth and silt with the water in which the dredge is submerged so that the mixture entering the pumps is in the nature of a slurry. Such mixture enters the pockets 47 in the pumps and is conveyed through the pumps to the discharge ports 54 connected to discharge conduits 11. While an individual discharge conduit has been shown for each of the outlet ports 54, it will be understood that such ports may be manifolded in sets of two or three, thereby reducing the number of discharge conduits.

Figure 5:
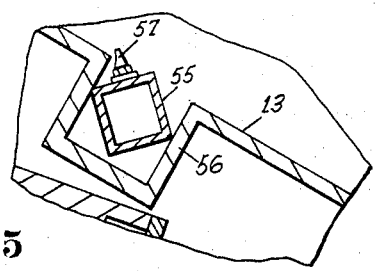
FIGURE 5 is an enlarged fragmentary sectional view taken along the line 5—5 of FIGURE 4 illustrating the spray bar utilized to provide jet streams to thin out the earth collected by the dredge.

It is also within the spirit and purpose of the invention to utilize the motor driving fluid discharged through the outlets 44 to assist in thinning out the earth so that it will more readily pass into the auger compartments. To this end, and as seen in FIGURES 4 and 5, a spray bar 55 may be mounted in a cavity 56 in the bottom wall of the scoop, the spray bar having a plurality of spray nozzles 57 arranged to direct jets of fluid against the earth in the scoop as it is moved toward the opening 17. The spray bar will be connected through its inlet 58 (FIGURE 4) to the outlets 44 through suitable conduit means, indicated at 59, and in this connection a plurality of the outlets 44 may be manifolded in the manner illustrated in FIGURE 6 wherein the manifold 60 connects a series of the outlets to the conduit 59.

The embodiments of the invention in which an exclusive property is claimed are defined as follows:

1. An underwater dredge comprising a body having a scoop at its forward end, a fluid pump mounted on said dredge, said fluid pump comprising a stator having internal helical threads and a rotor having external helical threads received in said stator, a fluid motor also mounted on said dredge, said fluid motor comprising a stator having internal helical threads and a rotor having external helical threads received in said stator, means comprising a universal joint connecting one end of the pump rotor to one end of the motor rotor, the said pump and motor being oriented relative to each other so that the helical threads of the motor will be of opposite hand to the helical threads of the pump, whereby the rotation of the two rotors will be in the same direction but the flow of fluid through the motor will be countercurrent to the flow of fluid through the pump, means in communication with said scoop for feeding material collected in said scoop to the inlet side of said pump, and conduit means connected to the outlet side of said pump for delivering material passed through said pump to a discharge station remote from said dredge.

2. The dredge claimed in claim 1 wherein the pump and motor are mounted with their rotors in general axial alignment, and wherein the threads of the motor and pump are oriented so as to cause fluid to flow through the motor toward the pump, and through the pump toward the motor.

3. The dredge claimed in claim 2 wherein the means for feeding material collected in said scoop to the inlet side of said pump comprises an auger operatively connected to the rotor of said pump.

4. The dredge claimed in claim 1 wherein said scoop has an inclined bottom wall having an opening therein and wherein said auger is mounted in a chamber underlying said opening.

5. The dredge claimed in claim 4 wherein the body of said dredge is hollow, and wherein said body is divided by bulkheads into a plurality of ballast tanks.

6. The dredge claimed in claim 5 wherein said fluid motor has an inlet end and an outlet end for the passage of fluid therethrough, means operatively connecting the outlet end of said motor to a spray bar mounted on said scoop, said spray bar having a plurality of outlets arranged to direct jets of fluid against the material collected in said scoop.

7. A dredge comprising a body having a scoop at its forward end, said scoop having opposing side walls and an upwardly inclined bottom wall, a transversely disposed opening intermediate the leading and trailing ends of said bottom wall, a plurality of compartments underlying the opening in said bottom wall, an auger rotatably mounted in each of said compartments, a separate fluid pump for each of said augers, said fluid pumps each comprising a rotor and a stator, means operatively connecting the rotors of said pumps to said augers, a fluid motor for each of said pumps, said fluid motors each comprising a rotor and a stator, means operatively connecting the rotors of said motors to the rotors of said pumps, and means operatively connecting said motors to a source of fluid under pressure.

8. A dredge claimed in claim 7 wherein the outlet sides of said pumps are connected to discharge conduits for delivering material passed through said pumps to a point remote from said dredge, and wherein the inlet sides of said motors are connected to supply conduits for delivering fluid under pressure to said motors from a point remote from said dredge.

9. The dredge claimed in claim 8 including duct means operatively connected to the outlet sides of said motors, and spray means connected to said ducts, said spray means being mounted on said scoop and positioned to direct jets of fluid against the material collected therein.

10. The dredge claimed in claim 8 wherein the body of said dredge is hollow and is divided by bulkheads into a plurality of ballast compartments.

11. In apparatus wherein a fluid pump is driven by a motor, a fluid pump comprising a stator having internal helical threads and a rotor having external helical threads received in said stator, a fluid motor also comprising a stator having internal helical threads and a rotor having external helical threads received in said stator, means comprising a universal joint connecting one end of the pump rotor to one end of the motor rotor, the pump and motor being oriented relative to the other so that the helical threads of the motor will be of opposite hand to the helical threads of the pump, whereby the rotation of the two rotors will be in the same direction but the flow of fluid through the motor will be countercurrent to the flow of fluid through the pump.

12. The apparatus claimed in claim 11 wherein the pump and motor are mounted with their rotors in general axial alignment, and wherein the threads of the motor and pump are oriented so as to cause fluid to flow through the motor toward the pump, and through the pump toward the motor.

References Cited
UNITED STATES PATENTS

| | | | |
|---|---|---|---|
| 216,061 | 6/1879 | Shaw | 37—58 |
| 590,392 | 8/1897 | Emerson | 37—61 |
| 597,190 | 1/1898 | Reynolds | 37—57 XR |
| 813,935 | 2/1906 | Avery | 37—56 |
| 1,854,383 | 4/1932 | Rotinoff | 37—61 |
| 2,100,560 | 11/1937 | Kennedy | 103—118 |
| 3,216,768 | 11/1965 | Soeding et al. | 103—117 XR |
| 3,248,812 | 5/1966 | Gardner | 37—61 |
| 3,271,081 | 9/1966 | Huddleston | 103—117 XR |
| 3,299,823 | 1/1967 | Marshall | 103—118 XR |

ROBERT E. PULFREY, *Primary Examiner.*

CLIFFORD D. CROWDER, *Assistant Examiner.*

U.S. Cl X.R.

37—63, 71; 103—5, 117, 118